United States Patent
Takagi et al.

[11] Patent Number: 6,005,481
[45] Date of Patent: Dec. 21, 1999

[54] REMAINING FUEL ALARM FOR VEHICULAR FUEL-COMBUSTION HEATER

[75] Inventors: Masahiro Takagi, Dublin, Ohio; Masashi Tsuneishi, Tochigi-ken, Japan; Makoto Kobayashi, Tochigi-ken, Japan; Masahiro Kimishima, Tochigi-ken, Japan; Hiroshi Echigoya, Utsunomiya, Japan

[73] Assignee: Honda Giken Kogyo Kabushiki Kaisha, Tokyo, Japan

[21] Appl. No.: 09/066,819

[22] Filed: Apr. 28, 1998

[30] Foreign Application Priority Data

Apr. 30, 1997 [JP] Japan ................... 9-112081

[51] Int. Cl.⁶ .................................. B60Q 1/00
[52] U.S. Cl. ................ 340/450.2; 340/618; 340/622; 165/43; 165/202
[58] Field of Search .................. 340/618, 619, 340/620, 621, 622, 623, 450, 450.2; 165/201, 202, 43

[56] References Cited

U.S. PATENT DOCUMENTS

| | | | |
|---|---|---|---|
| 4,228,783 | 10/1980 | Kalenian | 126/112 |
| 4,974,337 | 12/1990 | Tavakoli et al. | 34/27 |
| 5,400,010 | 3/1995 | Lechevalier | 340/450.3 |
| 5,490,572 | 2/1996 | Tajiri et al. | 180/65.1 |
| 5,641,016 | 6/1997 | Isaji et al. | 165/43 |

FOREIGN PATENT DOCUMENTS

| | | |
|---|---|---|
| 8-96269 | 4/1996 | Japan . |
| 8-197937 | 8/1996 | Japan . |

*Primary Examiner*—Daniel J. Wu
*Attorney, Agent, or Firm*—Birch, Stewart, Kolasch & Birch, LLP

[57] ABSTRACT

Disclosed is a remaining fuel alarm for a vehicular fuel-combustion heater, comprising a thermistor for detecting whether or not a predetermined amount of fuel is stored in a fuel tank, a remaining fuel alarm lamp for displaying the fact that a remaining amount of fuel in the fuel tank is not more than a predetermined amount, and a relay for enabling the remaining fuel alarm lamp to operate only when a signal to request operation of a fuel-combustion heater is inputted.

8 Claims, 9 Drawing Sheets

REMAINING FUEL ALARM FOR VEHICULAR FUEL-COMBUSTION HEATER

BACKGROUND OF THE INVENTION

1. Field of the Invention

The present invention relates to a remaining fuel alarm for a vehicular fuel-combustion heater for heating, with combustion heat, a heating medium which heats air flowing through a duct having air outlets openable into a passenger's compartment, through heat exchange between the heating medium and the air.

2. Description of the Related Art

In general, air-conditioning systems for use on electric vehicles cannot use a heating medium in the form of cooling water which would otherwise be heated by cooling internal combustion engines. For this reason, for example, a vehicular air-conditioning system is known, which is disclosed in Japanese laid-open patent publication No. 8-197937.

The disclosed air-conditioning system has a duct for passing air therethrough into a passenger's compartment, wherein the air-conditioning system operates selectively in a refrigerating cycle which involves an air blower for delivering air through the duct into the passenger's compartment, a coolant compressor for compressing and discharging a coolant, a coolant-water heat exchanger for heating hot water through heat exchange between the compressed coolant discharged from the coolant compressor and the hot water, and a coolant evaporator for cooling air with the heat of evaporation of the coolant, and in a hot-water cycle which involves a pump for circulating the hot water heated by the coolant-water heat exchanger and a hot-water heater disposed in the duct for heating air flowing through the duct with the hot water flowing from the coolant-water heat exchanger. The hot-water cycle also involves a fuel-combustion heater, connected in series with the hot-water heater, for heating the hot water with heat generated when a fuel is combusted, in order to obtain a sufficient heating capability, for example, in cold climates.

In this case, the fuel-combustion heater obtains the combustion heat for heating the hot water, by combusting the fuel such as kerosene, white gasoline, and gas oil. Therefore, in order to inform the passenger of the fact that the remaining amount of fuel is not more than a predetermined amount, for example, it is necessary to display a message on a panel and give a warning.

Therefore, in general, a remaining fuel alarm is adopted, which is involved in a fuel system for supplying fuel to an automobile engine. For example, as disclosed in Japanese laid-open patent publication No. 8-96269, such an apparatus comprises a thermistor which is disposed corresponding to a predetermined height of liquid level in a fuel tank. The apparatus is constructed such that when the level of the fuel arrives at the predetermined height of liquid level to cause the change in resistance value of the thermistor, then an alarm lamp is switched on, or it is switched on and off.

When the fuel-combustion heater is not used as in the summer season, the fuel is removed from the fuel tank in order to pre vent the fuel system from deterioration. Therefore, the thermistor is always exposed to air in the fuel tank, and the alarm lamp is always switched on (or switched on and off).

As described above, the following problem is pointed out. That is, the state, in which the alarm lamp is always turned on as in the summer season during which the fuel-combustion heater is not used, seriously obstructs the view of the passenger. It may be also conceived that the fuel is stored in the fuel tank throughout the year in order not to turn on the alarm lamp. However, such a countermeasure causes another problem that the fuel system is markedly deteriorated.

SUMMARY OF THE INVENTION

A principal object of the present invention is to provide a remaining fuel alarm for a vehicular fuel-combustion heater, which displays a message by the aid of an alarm display means only when the fuel-combustion heater is in an operation state, and which makes it possible to simplify the structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
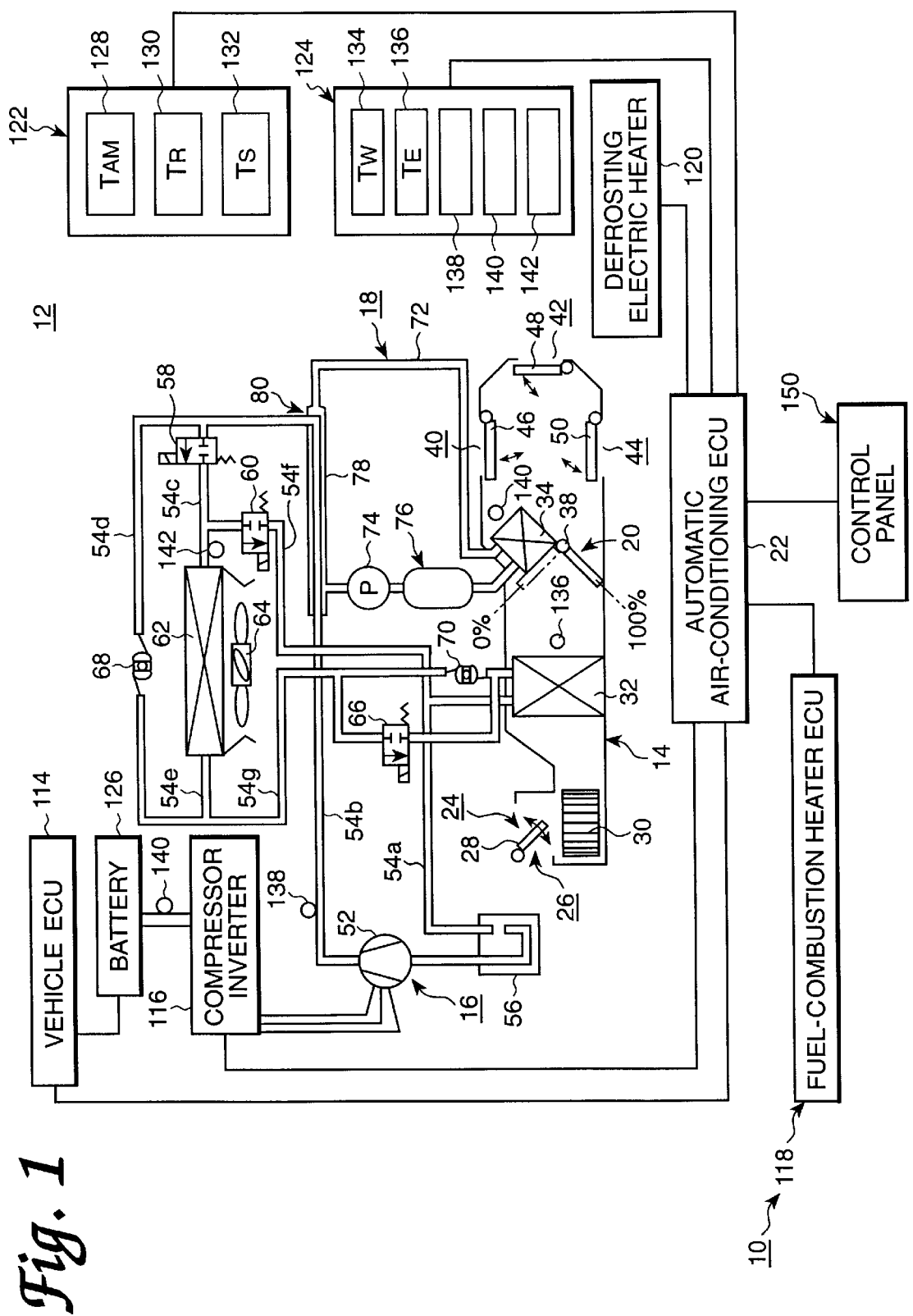
FIG. 1 is a schematic view, partly in block form, of an automatic air-conditioning system for use on an electric vehicle, to which a remaining fuel alarm according to the present invention is applied.

FIG. 1 schematically shows, partly in block form, an automatic air-conditioning system 12 for use on an electric vehicle, to which a remaining fuel alarm 10 according to the present invention is applied.

As shown in FIG. 1, the automatic air-conditioning system 12 has a duct 14 for discharging temperature-controlled and humidity-controlled air into the passenger's compartment of the electric vehicle, a cooling medium circuit 16 for cooling the air flowing through the duct 14 through heat exchange between the air and a coolant, a heating medium circuit 18 for heating the air flowing through the duct 14 through heat exchange between the air and hot water (heating medium), an air-mixing unit 20 disposed in the duct 14 for mixing and controlling cool air and hot air, and an automatic air-conditioning ECU 22 for controlling operation of various units including the air-mixing unit 20.

The duct 14 is disposed in front of the passenger's compartment with an instrumental panel (not shown) interposed therebetween. The duct 14 has on its upstream end an interior air inlet 24 for introducing air from an interior space in the passenger's compartment and an exterior air inlet 26 for introducing from an exterior space outside of the passenger's compartment, the interior air inlet 24 and the exterior air inlet 26 being selectively openable and closable by a switching damper 28.

In the duct 14, there are disposed an air blower 30 closely to the switching damper 28 and an evaporator 32 positioned downstream of the air blower 30, the evaporator 32 being part of the cooling medium circuit 16. The duct 14 also houses therein a heater core 34 disposed downstream of the evaporator 32, the heater core 34 being part of the heating medium circuit 18. The air-mixing unit 20 is mounted on an inlet side of the heater core 34. The air-mixing unit 20 has an air-mixing damper 36 which can be angularly moved to any desired angular position within an angular range from an angular extent 0% to an angular extent 100% by an air-mixing motor 38 coupled to the air-mixing damper 36.

The duct 14 has in its downstream end portion a defrosting outlet 40 for discharging air against the inner surface of a front windshield of the electric vehicle, a face outlet 42 for discharging air against the head of a passenger in the passenger's compartment, and a foot outlet 44 for discharging air against the feet of the passenger. The defrosting outlet 40, the face outlet 42, and the foot outlet 44 are associated respectively with a defrosting damper 46, a face damper 48, and a foot damper 50 which are angularly movable to open and close the defrosting outlet 40, the face outlet 42, and the foot outlet 44, respectively.

These outlets 40, 42, 44 operate selectively in various modes including a "DEF" mode in which the defrosting outlet 40 is selectively opened and closed by the defrosting damper 46, a "FOOT" mode in which the foot outlet 44 is selectively opened and closed by the foot damper 50, a "FOOT/DEF" mode in which the defrosting outlet 40 and the foot outlet 44 are selectively opened and closed by the defrosting damper 46 and the foot damper 50, a "VENT" mode (or "FACE" mode) in which the face outlet 42 is selectively opened and closed by the face damper 48, and a "B/L" mode in which the face outlet 42 and the foot outlet 44 are selectively opened and closed by the face damper 48 and the foot damper 50.

The evaporator 32 serves to evaporate a cooling medium flowing into the evaporator 32 and also to cool air which is introduced into the duct 14 by the air blower 30, through heat exchange between the air and the cooling medium. The cooling medium circuit 16 which includes the evaporator 32 includes a compressor 52 having an inlet port connected to an outlet port of the evaporator 32 by a cooling medium pipe 54a which has an accumulator 56. The compressor 52 compresses the cooling medium (gas coolant), drawn thereinto through the inlet port thereof, and it discharges a high-temperature, high-pressure cooling medium from an outlet port thereof into a cooling medium pipe 54b. The accumulator 56 separates the cooling medium into a liquid coolant and a gas coolant, and it supplies only the gas coolant to the compressor 52.

The cooling medium pipe 54b has an end portion branched into cooling medium pipes 54c, 54d, and the cooling medium pipe 54c is branched into cooling medium pipes 54e, 54f. The cooling medium pipe 54c has a first solenoid-operated valve 58, and the cooling medium pipe 54f has a second solenoid-operated valve 60. The cooling medium pipe 54f is connected to the cooling medium pipe 54a. The cooling medium pipe 54e has an exterior heat exchanger 62 which serves to evaporate a low-temperature, low-pressure cooling medium in a gas-liquid phase through heat exchange between the cooling medium and exterior air applied by an exterior fan 64 when the automatic air-conditioning system 12 operates in a heating mode to heat the passenger's compartment, and also to condense a high-temperature, high-pressure gas coolant into a liquid through heat exchange between the gas coolant and exterior air applied by the exterior fan 64 when the automatic air-conditioning system 12 operates in a cooling mode to cool the passenger's compartment.

The cooling medium pipe 54d has a first capillary tube 68 to be used for heating. The cooling medium pipes 54d, 54e are joined into a cooling medium pipe 54g which is connected to the inlet port of the evaporator 32. In the cooling medium pipe 54g, a third solenoid-operated valve 66 and a second capillary tube 70 used for cooling are provided in parallel to each other.

The heating medium circuit 18 includes a hot-water circulation pipe 72 for circulating and supplying hot water to the heater core 34, the hot-water circulation pipe 72 having a water pump 74 and a fuel-combustion heater 76 for generating heat by combusting a fuel. The fuel-combustion heater 76 is controlled in three modes, i.e., an igniting mode, a combustion ability switching mode (mode of normal heating operation), and an extinguishing mode. The hot-water circulation pipe 72 includes an outer conduit 78 disposed around and extending a certain length along a portion of the cooling medium pipe 54b of the cooling medium circuit 16. The cooling medium pipe 54b and the outer conduit 78 jointly provide a double-walled medium heat exchanger 80. When the high-temperature, high-pressure cooling medium discharged from the compressor 52 flows through the cooling medium pipe 54b, the medium heat exchanger 80 heats hot water flowing as a heating medium in the outer conduit 78 of the hot-water circulation pipe 72 through heat exchange between the heating medium and the cooling medium from the compressor 52.

Figure 2:
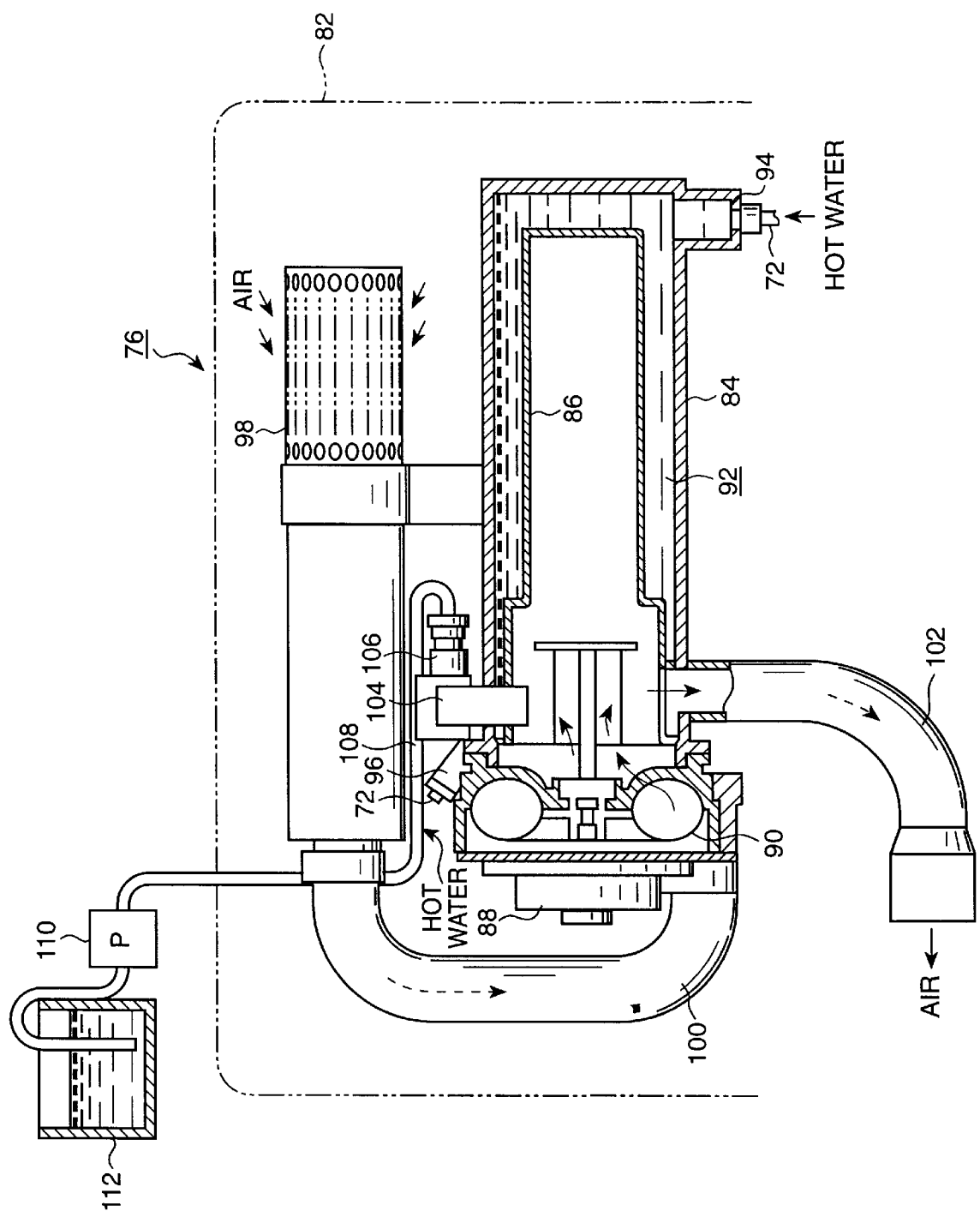
FIG. 2 is a vertical cross-sectional view of a fuel-combustion heater of the automatic air-conditioning system.

As shown in FIG. 2, the fuel-combustion heater 76 comprises a substantially cylindrical heater case 84 housed in a cover 82 and having a closed end. The heater case 84 houses a substantially cylindrical combustion tube 86 disposed coaxially therein and having a closed end. The heater case 84 has an open end on which an air blower 90 coupled to a motor unit 88 is mounted.

Between the heater case 84 and the combustion tube 86, there is defined a heat exchange passage 92 communicating with a hot water inlet port 94 and a hot water outlet port 96 which are defined in the heater case 84. An inlet pipe 100 has an end connected to the air blower 90 and an opposite end connected to a silencer 98. An exhaust pipe 102 for discharging exhaust gases is connected to the heater case 82 near its open end. The hot water inlet port 94 and the hot water outlet port 96 of the heater case 84 are connected to the hot-water circulation pipe 72.

Figure 3:
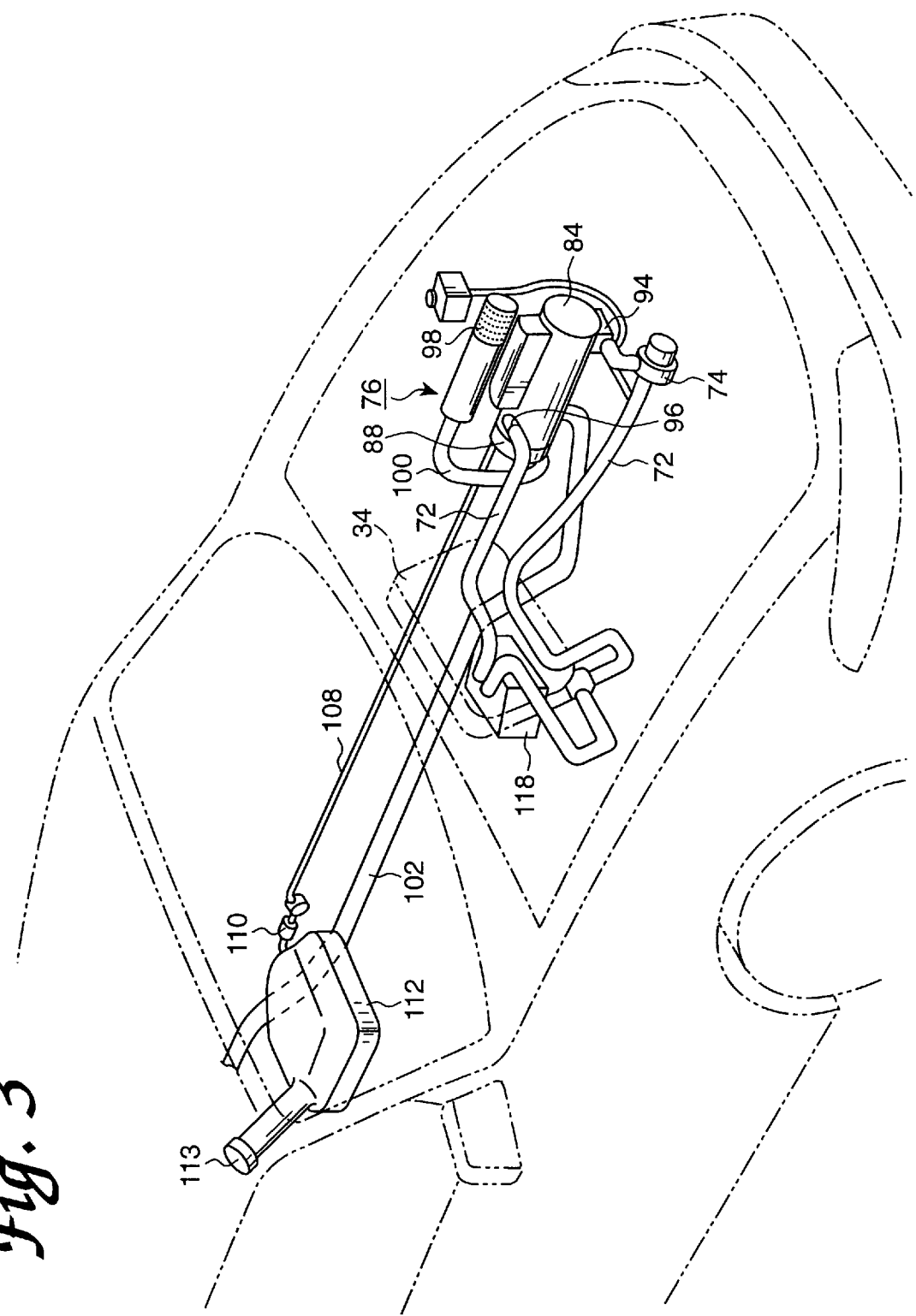
FIG. 3 is a schematic perspective view illustrative of the fuel-combustion heater.

A glow plug 104 for igniting the fuel when the automatic air-conditioning system 12 is started is mounted on the heater case 84 near the air blower 90. The glow plug 104 is connected to a fuel pipe 108 through a one-way valve 106. As shown in FIGS. 2 and 3, the fuel pipe 108 is connected to a fuel tank 112 through a fuel pump 110. The fuel tank 112 contains fuel such as kerosene, white gasoline, and gas oil. The fuel tank 112 is provided with a fuel supply port 113.

As shown in FIG. 1, to the automatic air-conditioning ECU 22, there are connected a vehicle ECU 114, a compressor inverter 116, a fuel-combustion heater ECU 118, a defrosting electric heater 120, an environmental condition input unit 122, and an operating condition input unit 124. The vehicle ECU 114 and the compressor inverter 116 are supplied with electric energy from a battery 126, and the compressor inverter 116 is connected to the compressor 52.

The environmental condition input unit 122 includes an ambient air temperature sensor 128 for detecting an ambient air temperature $T_{AM}$, a passenger's compartment temperature sensor 130 for detecting a passenger's compartment temperature $T_R$, and a sunlight intensity sensor 132 for detecting a sunlight intensity $T_S$ (kcal/h·m²). The operating condition input unit 124 includes a water temperature sensor 134 for detecting the temperature $T_W$ of hot water flowing through the heater core 34, an air temperature sensor 136 for detecting the temperature $T_E$ of air discharged from the evaporator 32, a pressure sensor 138 for detecting the pressure of the cooling medium discharged from the compressor 52, a current sensor 140 for detecting a current from the battery 126, and a cooling medium temperature sensor 142 for detecting the temperature of the cooling medium near the exterior heat exchanger 62.

Basically, the automatic air-conditioning ECU 22 can perform a function as a calculating means for calculating a target discharged-air temperature $T_{AO}$ based on inputted environmental conditions including the passenger's compartment temperature $T_R$ and ambient air temperature $T_{AM}$, and a desired temperature setting $T_{SET}$, a function as an operation mode selecting means for selecting one of operation modes including a cooling mode, an air blowing mode, a heating mode (carried out by the heat pump), and a heating mode (carried out by the fuel-combustion heater) based on the ambient air temperature $T_{AM}$, a function to control the discharged-air temperature based on the target discharged-air temperature $T_{AC}$, a function to serve as an ambient air temperature judging means for judging whether or not the ambient air temperature $T_{AM}$ detected by the ambient air temperature sensor 128 is not more than a predetermined temperature (for example, 0° C.), and a function to control the various components included in the entire automatic air-conditioning system 12.

Figure 4:
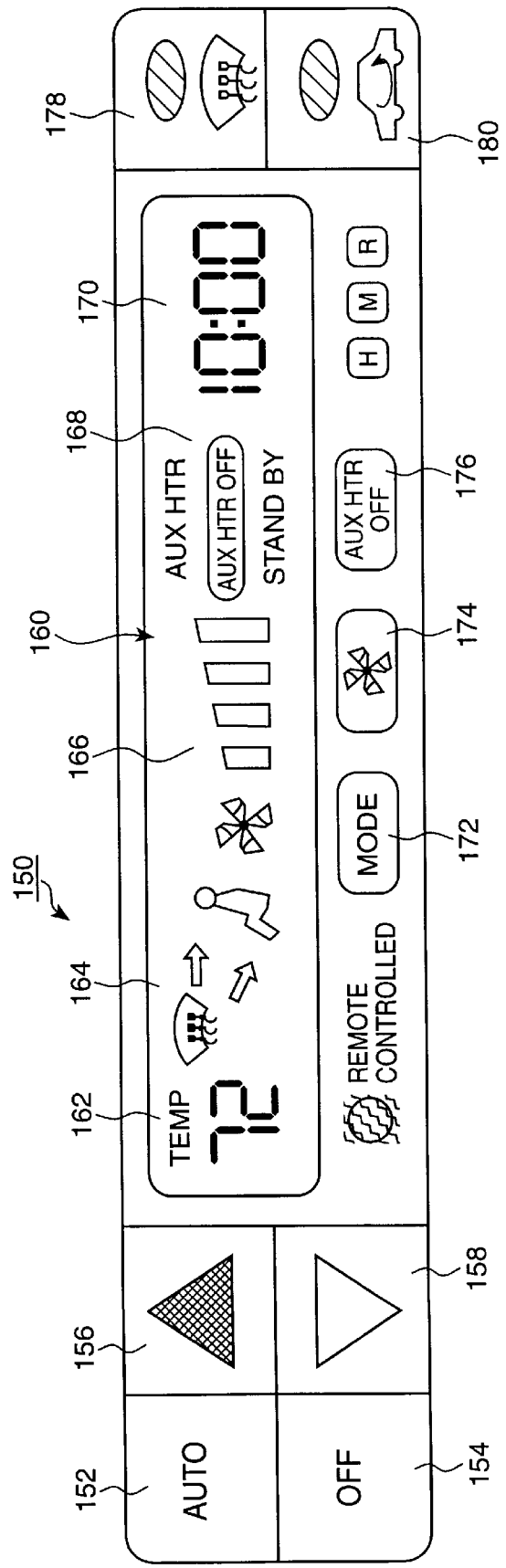
FIG. 4 is a front elevational view of a control panel of the automatic air-conditioning system.

To the automatic air-conditioning ECU 22, there is connected a control panel 150 which, as shown in FIG. 4, has an "AUTO" switch 152 for starting to energize the automatic air-conditioning system 12, an "OFF" switch 154 for turning off the entire operation of the automatic air-conditioning system 12, and temperature increasing and lowering switches 156, 158 disposed respectively adjacent to the "AUTO" switch 152 and the "OFF" switch 154 which are disposed at upper and lower positions at the left end of the control panel 150 as shown in FIG. 4.

The control panel 150 also has a longitudinally elongate liquid crystal display unit 160 disposed substantially centrally therein. The liquid crystal display unit 160 includes a temperature display area 162, an outlet mode display area 164, an air flow intensity display area 166, a fuel-combustion heater status display area 168, and a time display area 170. The fuel-combustion heater status display area 168 includes a display message "STAND BY" indicating that the fuel-combustion heater 76 is in the igniting mode or the extinguishing mode other than the combustion ability switching mode.

The control panel 150 also has, beneath the liquid crystal display unit 160, an outlet mode selector switch 172, an air flow intensity selector switch 174, and a fuel-combustion heater stop switch 176. The control panel 150 further includes a defrosting electric heater switch 178 and an air circulation/introduction selector switch 180 which are disposed at upper and lower positions at the right end of the control panel 150.

Figure 5:
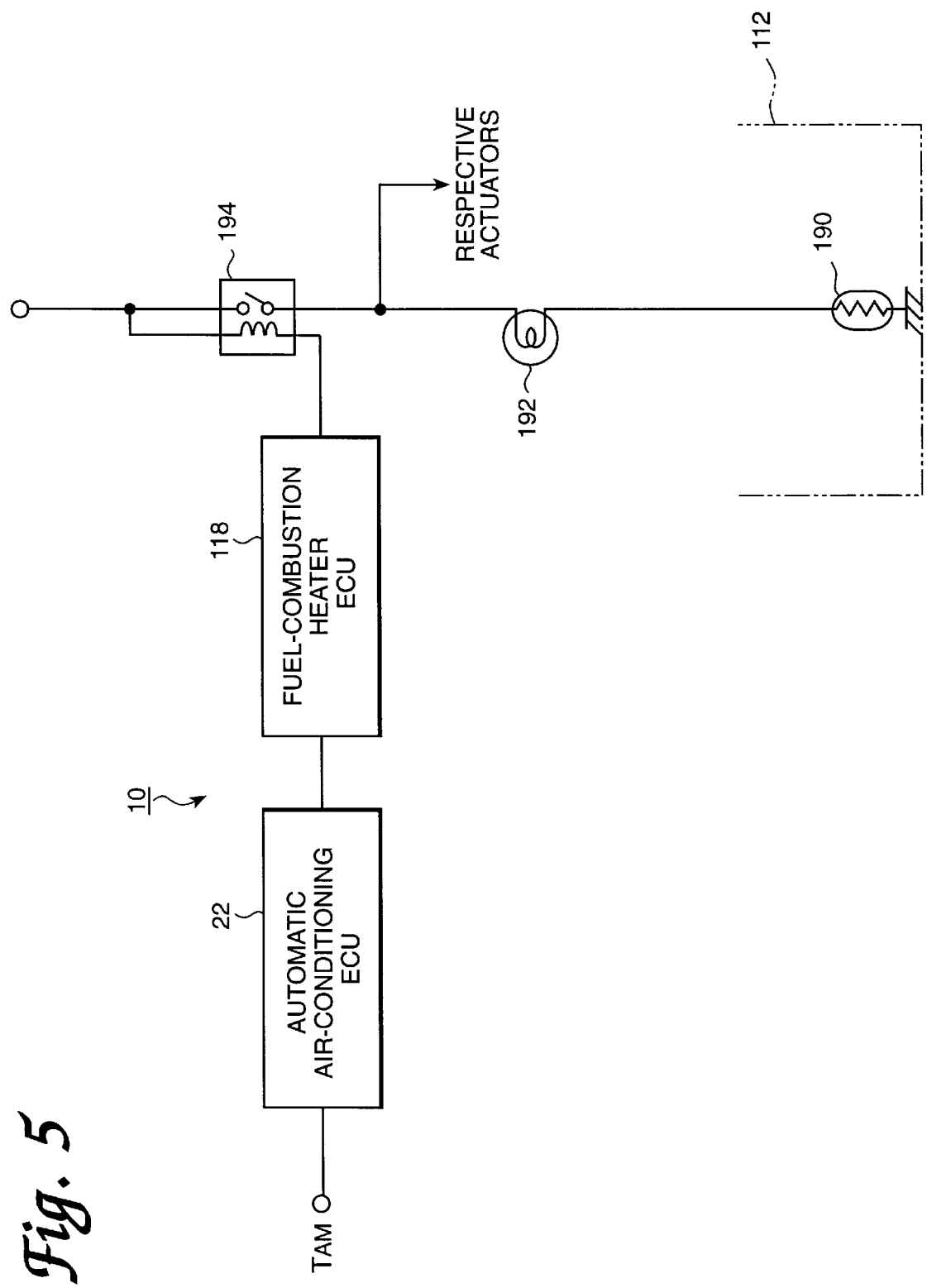
FIG. 5 is a circuit diagram of the remaining fuel alarm.

As shown in FIG. 5, the remaining fuel alarm 10 according to the present invention comprises a thermistor (remaining amount-detecting sensor) 190 for detecting whether or not a predetermined amount of fuel is stored in the fuel tank 112, a remaining fuel alarm lamp (alarm display means) 192 for displaying the fact that the remaining amount of fuel in the fuel tank 112 is not more than a predetermined amount, and a relay (operation control means) 194 for enabling the remaining fuel alarm 192 to operate only when a signal to request operation of the fuel-combustion heater 76 is inputted.

The relay 194 is operated and switched on and off by the fuel-combustion heater ECU 118. The remaining fuel alarm lamp 192 and the thermistor 190 are connected in series to the relay 194. The relay 194 functions to supply electric power from a power source to respective actuators (not shown) of the fuel-combustion heater system to perform initial check. The remaining fuel alarm lamp 192 is disposed at a position at which it is easily visible by the passenger.

Operation of the automatic air-conditioning system 12 to which the remaining fuel alarm 10 constructed as described above is applied will be described below.

Figure 6:
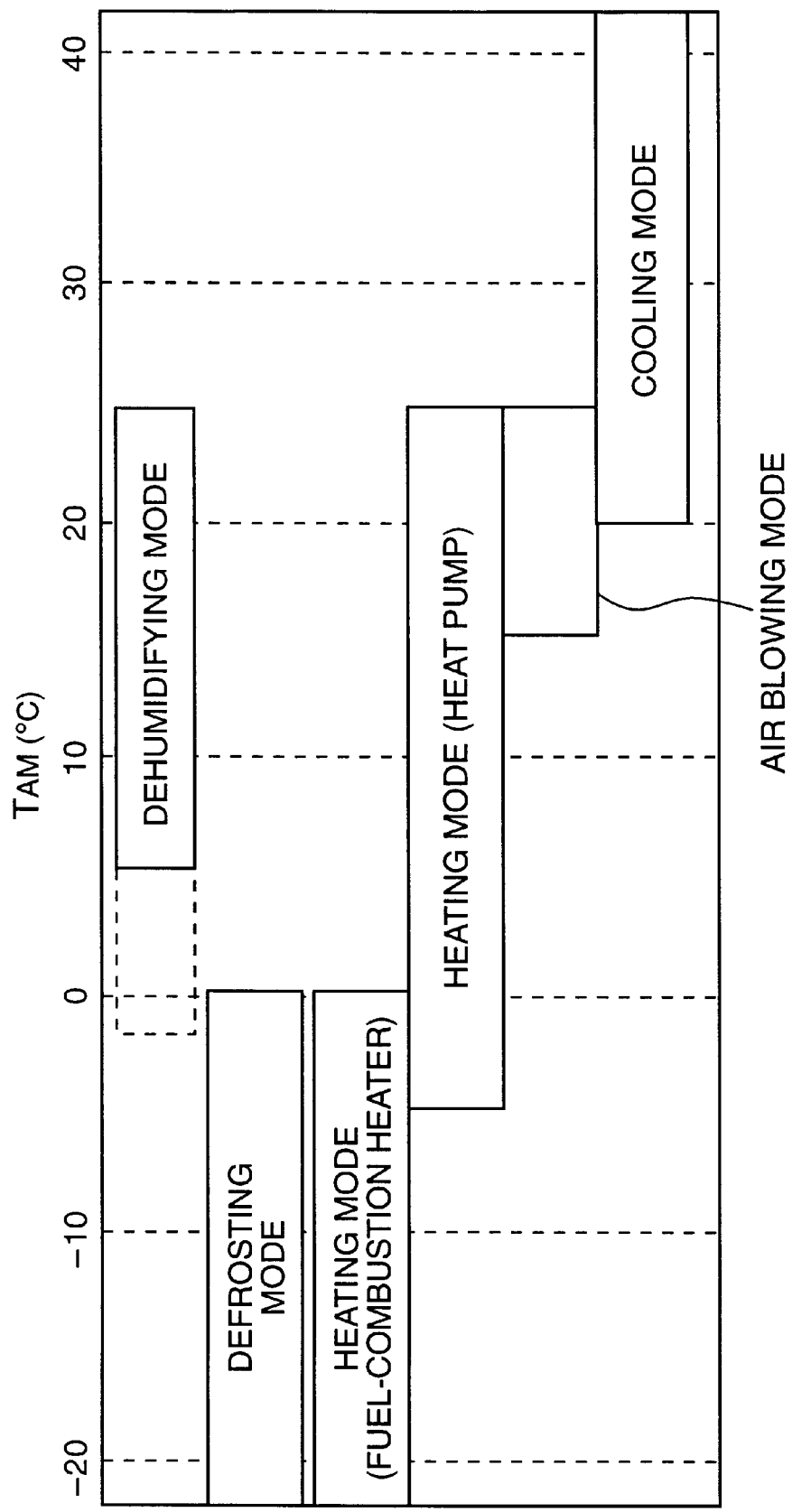
FIG. 6 is a diagram showing the relationship between various modes of operation of the automatic air-conditioning system and temperature ranges for the respective modes of operation.

The states of various components of the cooling medium circuit 16 when the automatic air-conditioning system 12 is in a cooling mode, a heating mode (carried out by a heat pump), a heating mode (carried out by the fuel-combustion heater), a dehumidifying mode, and an air blowing mode are shown in Table 1 given below, and the relationship between these modes of operation of the automatic air-conditioning system 12 and ambient air temperature ranges for the respective modes of operation are shown in FIG. 6.

TABLE 1

| Mode of operation | Cooling | Heating *1 | Heating *2 | Dehumi-difying | Air blowing |
|---|---|---|---|---|---|
| Solenoid-operated valve 56 | Open | Closed | Closed | Closed | Closed |
| Solenoid-operated valve 60 | Closed | Open | Closed | Closed | Closed |
| Solenoid-operated valve 66 | Closed | Closed | Closed | Open | Closed |
| Capillary tube 68 | — | Through | — | Through | — |
| Exterior heat exchanger 62 | Through | Through | — | — | — |
| Capillary tube 70 | Through | — | — | — | — |
| Evaporator 32 | Through | — | — | Through | — |
| Water pump 74 | Off | On | On | On | Off |
| Compressor 52 | On | On | Off | On | Off |

*1: Heat pump
*2: Fuel-combustion heater

Figure 7:
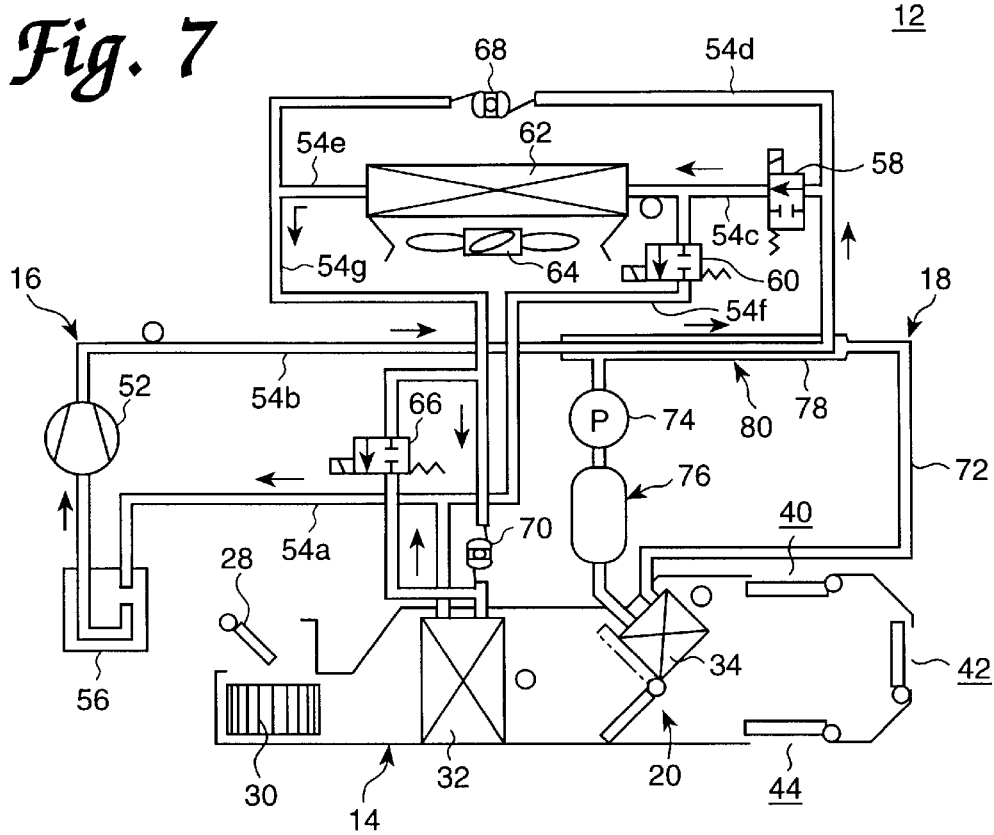
FIG. 7 is a schematic view illustrative of a cooling mode of the automatic air-conditioning system.

In the cooling mode, as shown in Table 1 and FIG. 7, the first solenoid-operated valve 58 is open and the second and third solenoid-operated valves 60, 66 are closed. Therefore, the cooling medium discharged from the compressor 52 flows through the cooling medium pipes 54b, 54c, the first solenoid-operated valve 58, the exterior heat exchanger 62, and the cooling medium pipe 54b into the second capillary tube 70, and then it flows through the evaporator 32 into the cooling medium pipe 54a, from which the cooling medium flows through the accumulator 56 back to the compressor 52.

Therefore, the high-temperature, high-pressure gas coolant discharged from the compressor 52 is turned to a liquid when the heat thereof is radiated by the exterior heat exchanger 62. The liquid coolant then flows through the second capillary tube 70 in which its pressure is reduced to produce a cooling medium in a gas-liquid phase. This cooling medium is evaporated in the evaporator 32 thereby to cool air that passes through the evaporator 32.

Figure 8:
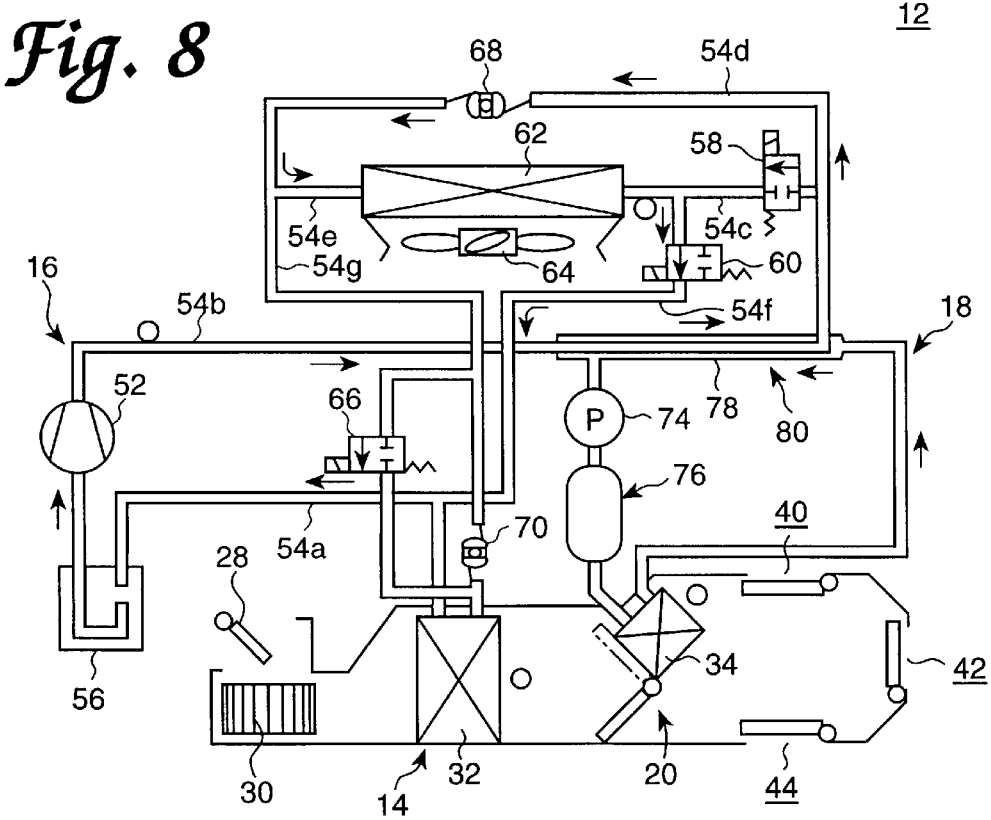
FIG. 8 is a schematic view illustrative of a heating mode (carried out by a heat pump) of the automatic air-conditioning system.

In the heating mode (carried out by a heat pump), as shown in Table 1 and FIG. 8, the first and third solenoid-operated valves 58, 66 are closed, and the second solenoid-operated valve 60 is open. Therefore, the cooling medium discharged from the compressor 52 flows through the cooling medium pipes 54b, 54d into the first capillary tube 68 in which its pressure is reduced to produce a cooling medium in a gas-liquid phase. The cooling medium passes through the exterior heat exchanger 62 and is evaporated, after which the cooling medium passes through the second solenoid-operated valve 60 and the cooling medium pipes 54f, 54a into the accumulator 56, from which the cooling medium flows back to the compressor 52.

In the heating medium circuit 18, the outer conduit 78 of the double-walled medium heat exchanger 80 is supplied with hot water. Consequently, when the high-temperature, high-pressure cooling medium flows through the cooling medium pipe 54b internally with respect to the outer conduit 78, it heats the hot water in the outer conduit 78. The heated hot water is introduced by the water pump 74 into the heater core 34 for thereby heating air that passes through the heater core 34 to a certain temperature.

Figure 9:
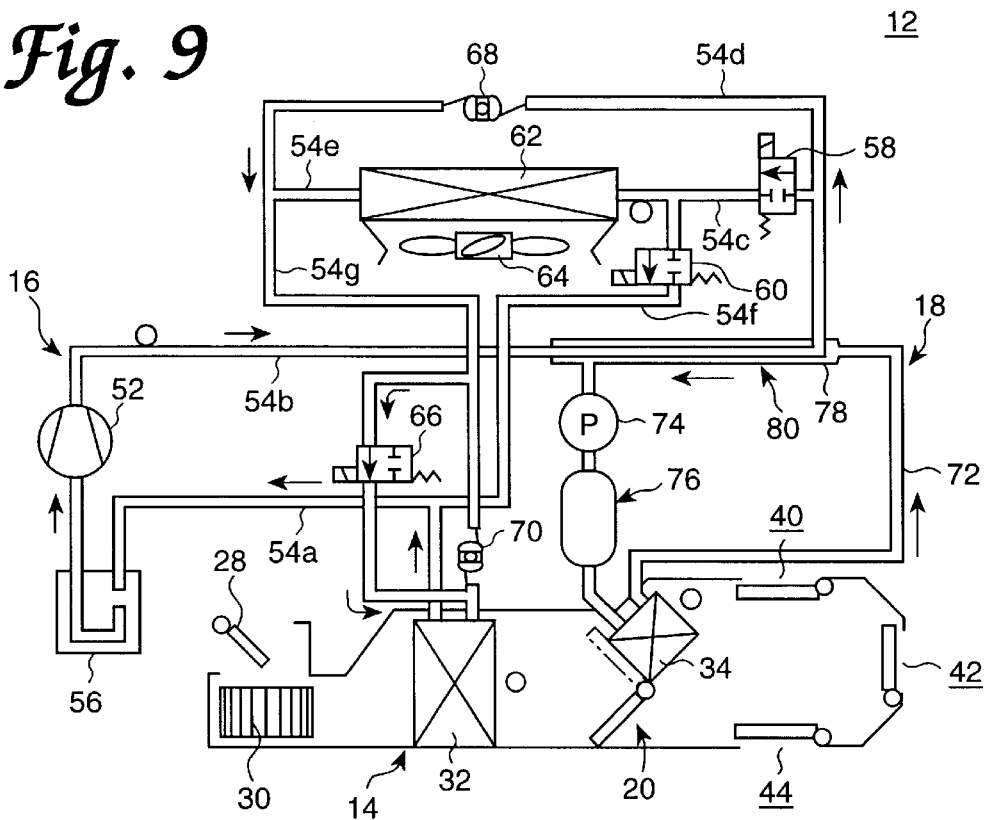
FIG. 9 is a schematic view illustrative of a dehumidifying mode of the automatic air-conditioning system.

In the dehumidifying mode, as shown in Table 1 and FIG. 9, the first and second solenoid-operated valves 58, 60 are closed, and the third solenoid-operated valve 66 is open. Therefore, the cooling medium discharged from the compressor 52 flows through the cooling medium pipes 54b, 54d, the first capillary tube 68, and the cooling medium pipe 54g into the third solenoid-operated valve 66. In the first capillary tube 68, the pressure of a cooling medium is reduced so that it is in a gas-liquid phase. The cooling medium then flows to the evaporator 32, it dehumidifies air that passes through the evaporator 32, and thereafter it flows from the cooling medium pipe 54a through the accumulator 56 back to the compressor 52.

Figure 10:
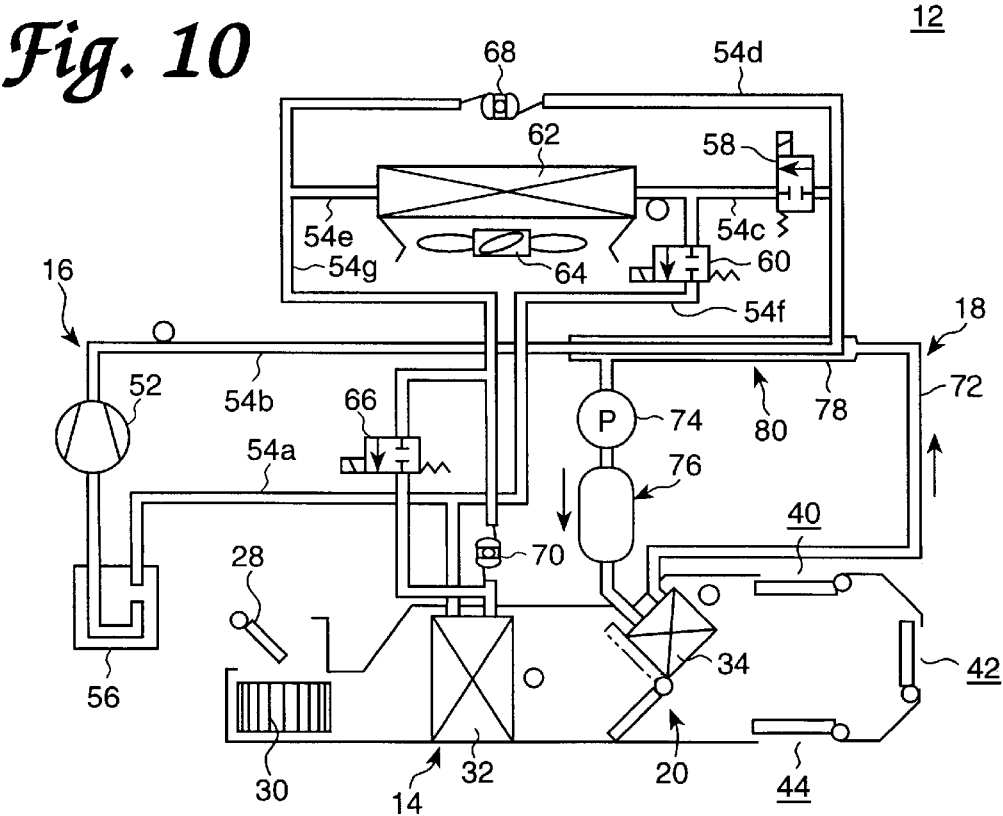
FIG. 10 is a schematic view illustrative of a heating mode (carried out by a fuel-combustion heater) of the automatic air-conditioning system.

In the heating mode (carried out by the fuel-combustion heater), as shown in Table 1 and FIG. 10, the first, second, and third solenoid-operated valves 58, 60, 66 are closed, and the compressor 52 is turned off, so that the automatic air-conditioning system 12 is not operating in an automatic air-conditioning cycle.

The fuel-combustion heater 76 is actuated. As shown in FIG. 2, the air blower 90 is rotated by the motor unit 88, and the fuel pump 110 is operated to supply the fuel (kerosene, white gasoline, gas oil, or the like) from the fuel tank 112 through the fuel pipe 108 and the one-way valve 106 to the combustion tube 86. The glow plug 104 is energized to ignite the supplied fuel which is combusted together with air that is supplied from the silencer 98 through the inlet pipe 100 by the air blower 90.

The heat exchange passage 92 in the heater case 84 is supplied with hot water from the hot-water circulation pipe 72 through the hot water inlet port 94. The supplied hot water is heated by heat exchange between itself and exhaust gases flowing through the combustion tube 86, and it flows back from the hot water outlet port 96 to the hot-water circulation pipe 72. The hot water heated by the fuel-combustion heater 76 is introduced into the heater core 34, and it heats air passing through the heater core 34 to a certain temperature. After the heat exchange, the exhaust gases are discharged from the combustion tube 86 through the exhaust pipe 102.

In the air blowing mode, the first, second, and third solenoid-operated valves 58, 60, 66 are closed, and the water pump 74 is turned off, as shown in FIG. 1.

Figure 11:
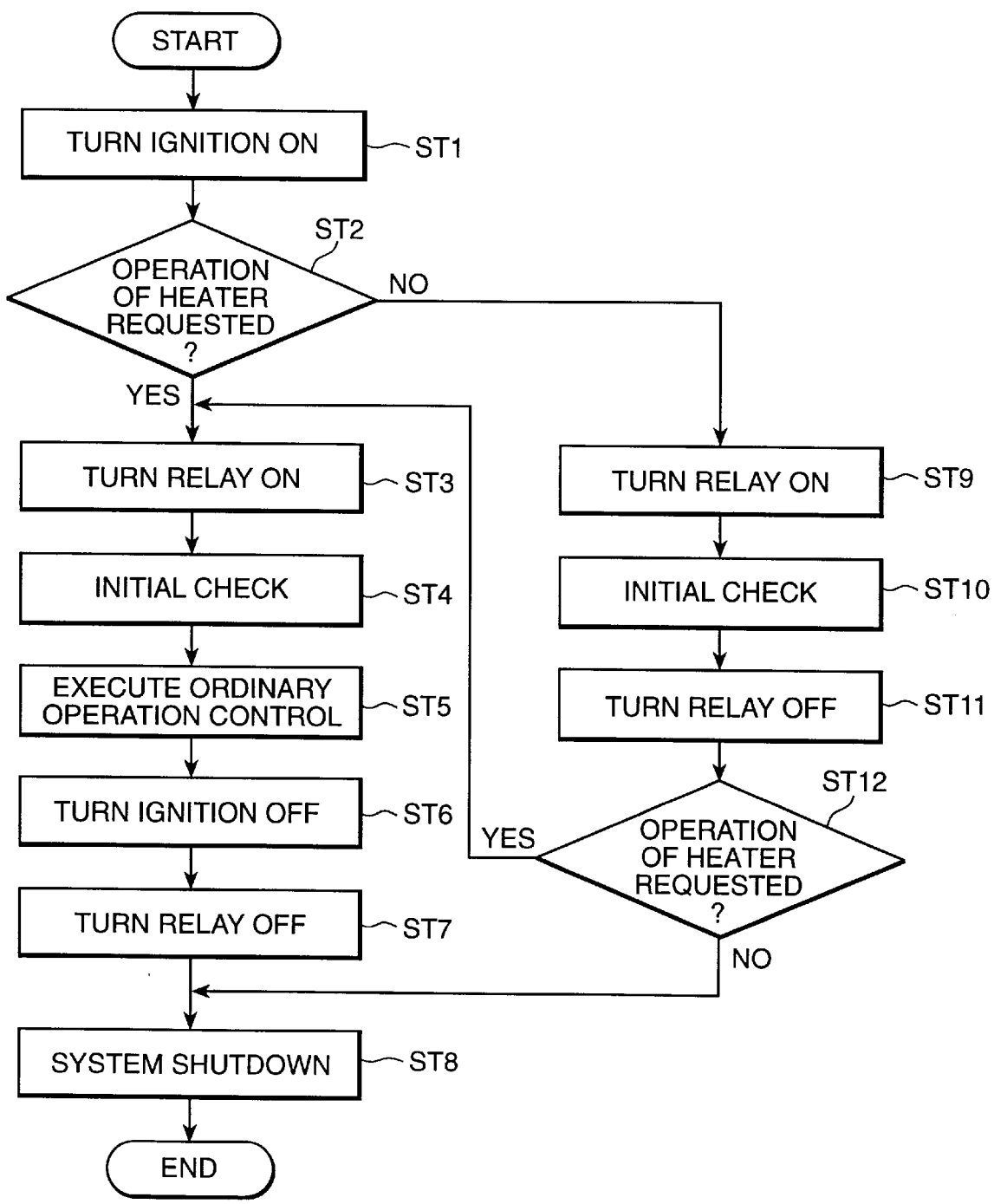
FIG. 11 is a flowchart of an operation sequence of the remaining fuel alarm.

The operation of the remaining fuel alarm 10 according to the present invention will be described below with reference to a flow chart shown in FIG. 11.

When the ignition is turned on (step ST1), and thereafter the "AUTO" switch 152 on the control panel 150 is turned on, then the automatic air-conditioning ECU 22 reads signals from the ambient air temperature sensor 128, the passenger's compartment temperature sensor 130, and the sunlight intensity sensor 132 of the environmental condition input unit 122 and also signals from the water temperature sensor 134, the air temperature sensor 136, the pressure sensor 138, the current sensor 140, and the cooling medium temperature sensor 142 of the operating condition input unit 124. The automatic air-conditioning ECU 22 also reads a desired temperature setting $T_{SET}$ which has been entered by the passenger by manually pressing the temperature increasing and lowering switches 156, 158.

Based on the desired temperature setting $T_{SET}$, and the parameters detected by the environmental condition input unit 122, i.e., the ambient air temperature $T_{AM}$ detected by the ambient air temperature sensor 128, the passenger's compartment temperature $T_R$ detected by the passenger's compartment temperature sensor 130, and the sunlight intensity $T_S$ detected by the sunlight intensity sensor 132, the automatic air-conditioning ECU 22 calculates a target discharged-air temperature $T_{AO}$ for the air to be discharged into the passenger's compartment according to the following equation (1):

$$T_{AO}=K_{SET} \times T_{SET}-K_R \times T_R-K_{AM} \times T_{AM}-K_S \times T_S-C \qquad (1)$$

where $K_{SET}$, $K_R$, $K_{AM}$, $K_S$ represent coefficients (gains) and C a constant.

A mode of operation of the automatic air-conditioning system 12 is selected from the map shown in FIG. 6, on the basis of the ambient air temperature $T_{AM}$ detected by the ambient air temperature sensor 128. If the detected ambient temperature $T_{AM}$ is not more than 0° C., the heating mode (carried out by the fuel-combustion heater) is selected. As shown in FIG. 5, the signal to request operation of the fuel-combustion heater 76 is inputted from the automatic air-conditioning ECU 22 to the fuel-combustion heater ECU 118 (YES in a step ST2).

Accordingly, the fuel-combustion heater ECU 118 turns on the relay 194 (step ST3), followed by initial check to control ordinary operation of the remaining fuel alarm 10 (step ST4 and step ST5). In the initial check, the electric power is applied from the power source for a predetermined period of time (for example, 4 seconds) to the respective actuators of the fuel-combustion heater ECU 118. Thus, the respective lamps are turned on to inspect the presence or absence of abnormality.

The remaining fuel alarm 10 is operated as follows. That is, the fuel in the fuel tank 112 is decreased as the fuel-combustion heater 76 is operated. When the liquid level of the fuel is not higher than the height of the thermistor 190, and the thermistor 190 is exposed to the air in the fuel tank 112, then the resistance value of the thermistor 190 is changed due to the temperature change or the self-heating. Therefore, when the resistance value of the thermistor 190 is lower than a previously set resistance value, the remaining fuel alarm lamp 192 is switched on. When the remaining fuel alarm lamp 192 is switched on, the passenger is able to confirm the fact that the fuel in the fuel tank 112 is in not more than the predetermined amount. The fuel may be supplemented from the fuel supply port 113 to the fuel tank 112.

When the routine proceeds to a step ST6, and the ignition is turned off, then the relay 196 is turned off, and the system is stopped (step ST7 and step ST8).

If the detected ambient air temperature $T_{AM}$ is not less than 0° C. in the step ST2, the signal to request the operation of the fuel-combustion heater 76 is not inputted from the automatic air-conditioning ECU 22 to the fuel-combustion heater ECU 118 (NO in the step ST2). Therefore, the routine proceeds to a step ST9, the relay 194 is once turned on, and the initial check for the fuel-combustion heater ECU 118 is performed for a predetermined period of time (for example, 4 seconds) (step ST10). Subsequently, the relay 194 is turned off (step ST11).

Next, the routine proceeds to a step ST12 to judge whether or not the signal to request the operation of the fuel-combustion heater 76 is given. If the operation request signal is given (YES in the step ST12), the routine proceeds to the step ST3. If the signal is not given, then the routine proceeds to the step ST8, and the system is stopped.

In the embodiment of the present invention, if it is judged that the ambient air temperature $T_{AM}$ is not more than 0° C. after the ignition is turned on, then the operation request signal for the fuel-combustion heater 76 is inputted, and the relay 194 is turned on. The thermistor 190 and the remaining fuel alarm 192 are maintained in the state in which they are operable. Accordingly, when the fuel in the fuel tank 112 is decreased to be not more than the predetermined amount, the remaining fuel alarm 192 is switched on by the aid of the thermistor 190.

If the ambient air temperature $T_{AM}$ is not less than 0° C., then the operation request signal for the fuel-combustion heater 76 is not inputted into the fuel-combustion heater ECU 118, and the relay 194 is turned off. Therefore, the remaining fuel alarm 192 is maintained in the state in which it is not operable. Accordingly, the remaining fuel alarm 192 is not switched on even when no fuel remains in the fuel tank 112 during the period such as the summer season in which the fuel-combustion heater 76 is not used.

Therefore, the uncomfortable state, in which the remaining fuel alarm lamp 192 is always switched on, can be certainly avoided even when the fuel is removed from the fuel tank 112, because the fuel-combustion heater 76 is not operated. Further, the present invention is effective in that it is unnecessary to store the fuel in the fuel tank 112 throughout the year in order not to turn on the remaining fuel alarm lamp 192, and thus the fuel system is effectively prevented from deterioration.

Even during the period in which the fuel-combustion heater 76 is not used, the relay 194 is once turned on for the predetermined period of time (for example, 4 seconds), after the ignition is turned on. Therefore, for example, the present invention is advantageous in that any failure of each of the actuators of the fuel-combustion heater ECU 118 can be detected, and the maintenance and the management for the actuators can be reliably performed.

In the embodiment of the present invention, whether or not the fuel-combustion heater 76 is usable is judged by the automatic air-conditioning ECU 22 by comparing the ambient air temperature $T_{AM}$ with the predetermined temperature (for example, 0° C.). When the operation of the fuel-combustion heater 76 is required, the operation request signal is outputted to the fuel-combustion heater ECU 118. However, there is no limitation thereto. For example, the automatic air-conditioning ECU 22 calculates the target discharged-air temperature $T_{AO}$. The signal to request the operation of the fuel-combustion heater 76 may be inputted to the fuel-combustion heater ECU 118 by selecting the operation mode on the basis of the target discharged-air temperature $T_{AO}$.

As described above, according to the remaining fuel alarm for the vehicular fuel-combustion heater concerning the present invention, the alarm display means is operable only when the operation request signal for the fuel-combustion heater is inputted. The fact that the remaining amount of fuel in the fuel tank is not more than the predetermined amount is displayed, for example, by the alarm lamp. During the period such as the summer season in which the fuel-combustion heater is not used, the alarm display means is not operated. Therefore, no display is given by the alarm lamp even when the remaining amount of fuel in the fuel tank is not more than the predetermined amount. Accordingly, the uncomfortable state, in which the alarm display means is always turned on, is not given even when the fuel is removed from the fuel tank during the summer season or the like. The present invention makes it possible to perform the effective alarm display by means of the alarm display means by using the simple structure.

What is claimed is:

1. A remaining fuel alarm for a vehicular fuel-combustion heater for heating, with combustion heat, a heating medium which heats air flowing through a duct having air outlets openable into a passenger's compartment, through heat exchange between said heating medium and said air, said remaining fuel alarm comprising:

a remaining amount-detecting sensor for detecting whether or not a predetermined amount of fuel is stored in a fuel tank for supplying said fuel to said fuel-combustion heater;

an alarm display means for displaying information indicating that a remaining amount of fuel in said fuel tank is not more than a predetermined amount; and an operation control means for disconnecting supply of electrical power to said alarm display means, thereby enabling said alarm display means to operate only when a signal to request operation of said fuel-combustion heater is inputted.

2. The remaining fuel alarm according to claim 1, wherein said remaining amount-detecting sensor comprises a thermistor disposed in said fuel tank, for detecting a height of a liquid level of said fuel in said fuel tank.

3. The remaining fuel alarm according to claim 1, wherein said operation control means is operated by a fuel-combustion heater ECU so that it is opened and closed, and said operation control means comprises a relay which is connected in series to said remaining amount-detecting sensor and said alarm display means.

4. The remaining fuel alarm according to claim 1, further comprising:

an automatic air-conditioning ECU for calculating a target discharged-air temperature to select a mode of operation on the basis of said target discharged-air temperature, wherein:

said automatic air-conditioning ECU is used to input a signal to request operation of said fuel-combustion heater by selecting, as said mode of operation, a heating mode effected by said fuel-combustion heater.

5. A remaining fuel alarm for a vehicular fuel-combustion heater for heating, with combustion heat, a heating medium which heats air flowing through a duct having air outlets openable into a passenger's compartment, through heat exchange between said heating medium and said air, said remaining fuel alarm comprising:

a remaining amount-detecting sensor for detecting whether or not a predetermined amount of fuel is stored in a fuel tank for supplying said fuel to said fuel-combustion heater;

an alarm display means for displaying information indicating that a remaining amount of fuel in said fuel tank is not more than a predetermined amount;

an ambient air temperature sensor for detecting an ambient air temperature;

an ambient temperature-judging means for judging whether or not said ambient air temperature detected by said ambient air temperature sensor is not more than a predetermined temperature; and an operation control means for disconnecting supply of electrical power to said alarm display means, thereby enabling said alarm display means to operate only when said detected ambient air temperature is not more than said predetermined temperature.

6. The remaining fuel alarm according to claim 5, wherein said remaining amount-detecting sensor comprises a thermistor disposed in said fuel tank, for detecting a height of a liquid level of said fuel in said fuel tank.

7. The remaining fuel alarm according to claim 5, wherein said operation control means is operated by a fuel-combustion heater ECU so that it is opened and closed, and said operation control means comprises a relay which is connected in series to said remaining amount-detecting sensor and said alarm display means.

8. The remaining fuel alarm according to claim 5, wherein said ambient temperature-judging means comprises an automatic air-conditioning ECU which has a function to calculate a target discharged-air temperature, a function to select a mode of operation, and a function to control a discharged-air temperature.

* * * * *

UNITED STATES PATENT AND TRADEMARK OFFICE
CERTIFICATE OF CORRECTION

| | |
|---|---|
| PATENT NO. | : 6,005,481 |
| DATED | : December 21, 1999 |
| INVENTOR(S) | : Masahiro Takagi et al. |

It is certified that error appears in the above-identified patent and that said Letters Patent is hereby corrected as shown below:

The clarifications to the drawings are as follows:

Figures 1 and 7-10:
Capillary tubes 68 and 70 have been clarified to clearly identify capillary tubes.

Figure 2:
Hot-water circulation pipe 72 connected to the hot water outlet port 96 has been clarified to show hot water flowing out of the hot-water circulation pipe 72. Furthermore, the bold dotted lines which improperly depict the surface of the water have been deleted.

Figures 8-10:
The arrows showing the flow of hot water in the heating medium circuit have been changed to dotted lines to distinguish from the flow of the cooling medium. Furthermore, the passage to the first solenoid-operated valve 58 has been corrected to be illustrated as open.

Signed and Sealed this

Twenty-eighth Day of August, 2001

*Nicholas P. Godici*

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,005,481
DATED : December 21, 1999
INVENTOR(S) : Masahiro Takagi et al.

It is certified that error appears in the above-identified patent and that said Letters Patent is hereby corrected as shown below:

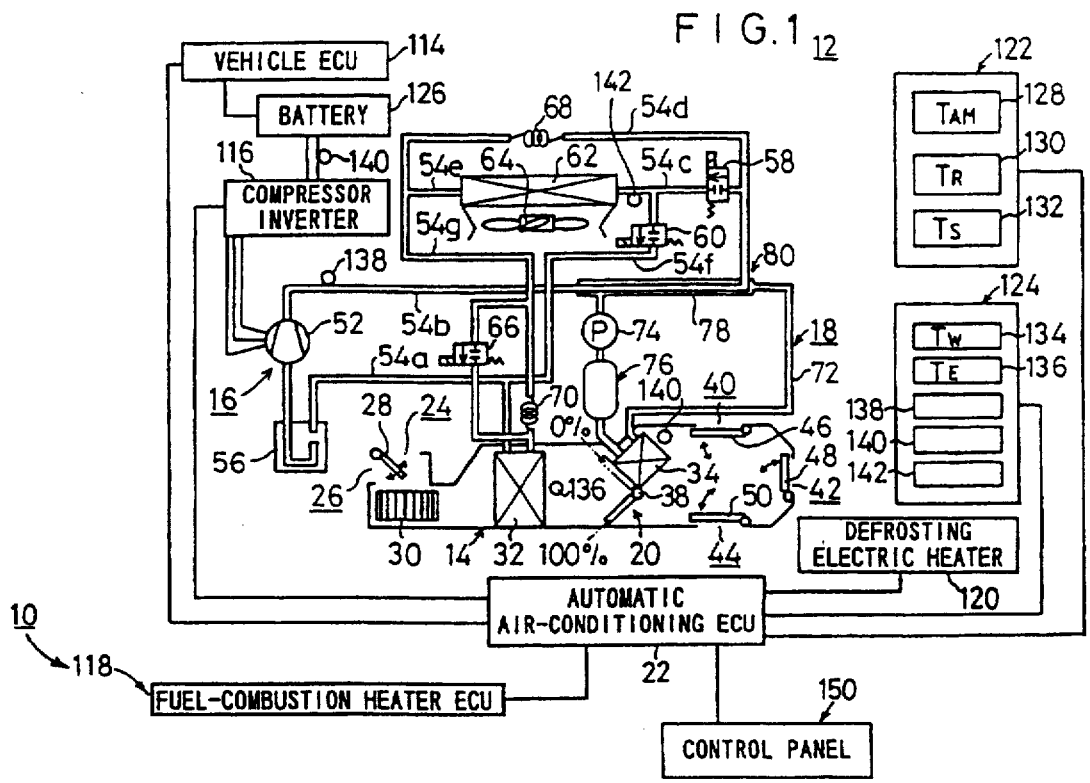

FIG. 1

UNITED STATES PATENT AND TRADEMARK OFFICE
CERTIFICATE OF CORRECTION

PATENT NO. : 6,005,481
DATED : December 21, 1999
INVENTOR(S) : Masahiro Takagi et al.

It is certified that error appears in the above-identified patent and that said Letters Patent is hereby corrected as shown below:

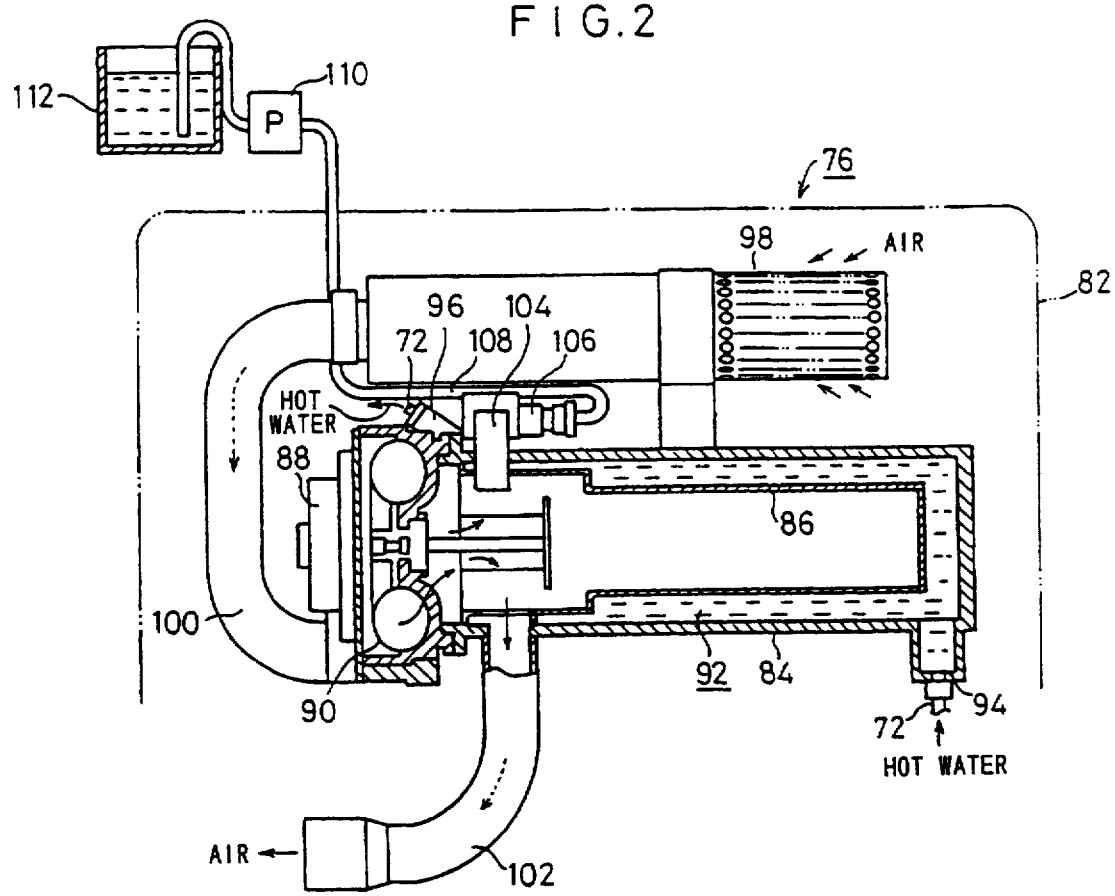

FIG.2

UNITED STATES PATENT AND TRADEMARK OFFICE
CERTIFICATE OF CORRECTION

PATENT NO. : 6,005,481
DATED : December 21, 1999
INVENTOR(S) : Masahiro Takagi et al.

It is certified that error appears in the above-identified patent and that said Letters Patent is hereby corrected as shown below:

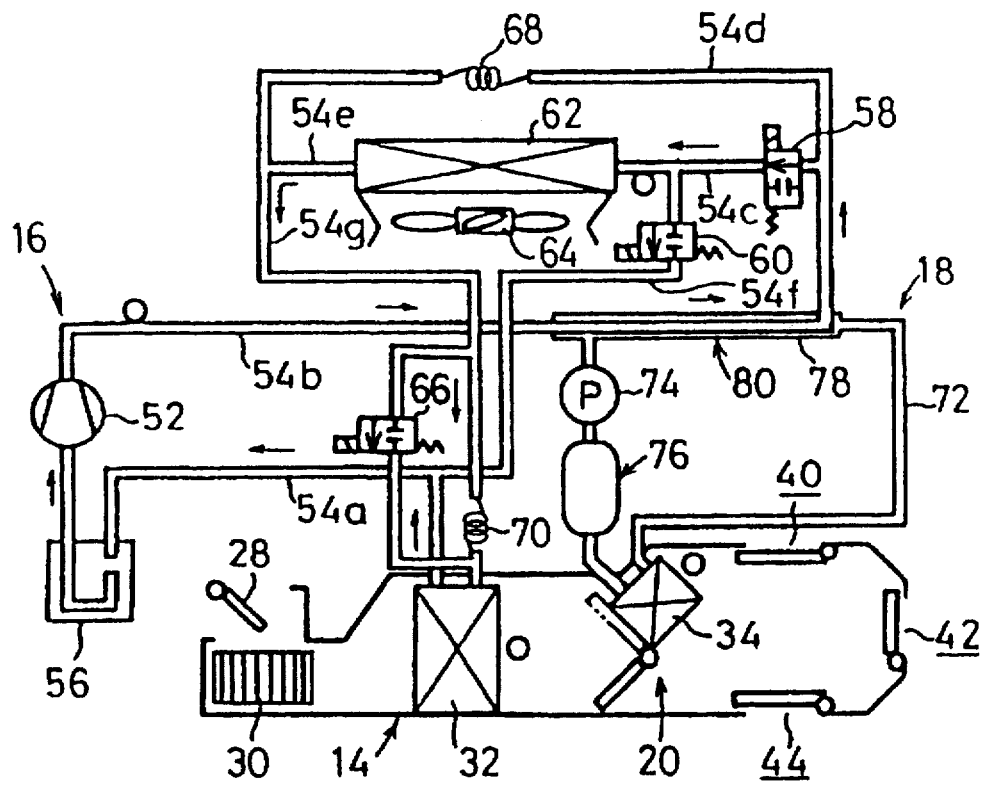

FIG.7

UNITED STATES PATENT AND TRADEMARK OFFICE
CERTIFICATE OF CORRECTION

PATENT NO. : 6,005,481
DATED : December 21, 1999
INVENTOR(S) : Masahiro Takagi et al.

It is certified that error appears in the above-identified patent and that said Letters Patent is hereby corrected as shown below:

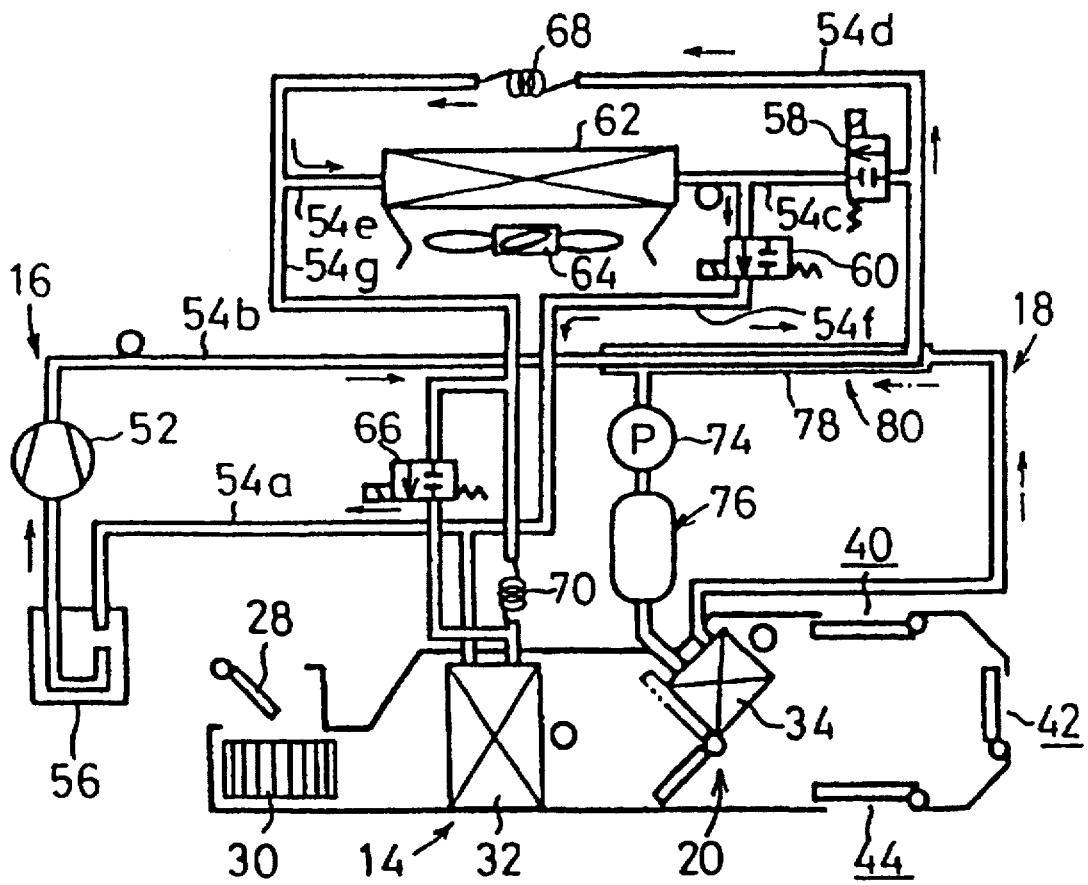

FIG. 8

UNITED STATES PATENT AND TRADEMARK OFFICE
CERTIFICATE OF CORRECTION

PATENT NO. : 6,005,481
DATED : December 21, 1999
INVENTOR(S) : Masahiro Takagi et al.

It is certified that error appears in the above-identified patent and that said Letters Patent is hereby corrected as shown below:

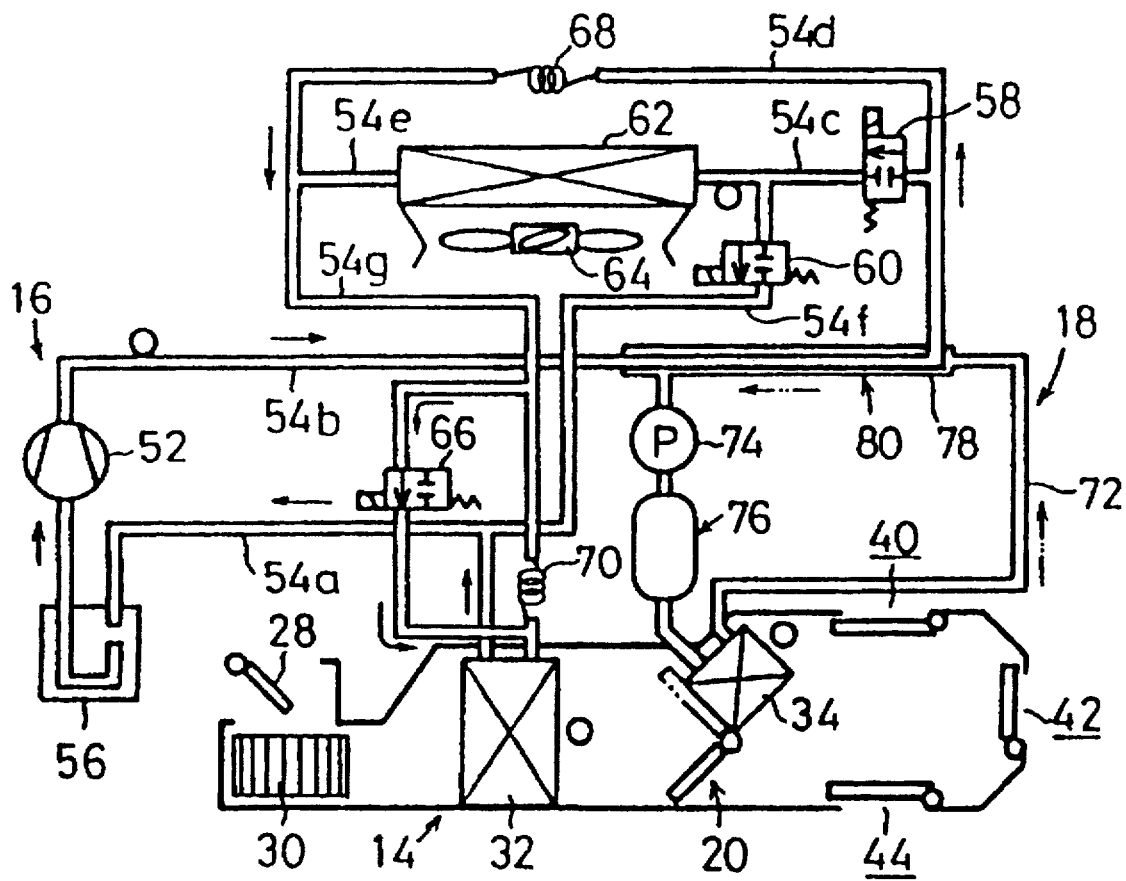

FIG. 9

UNITED STATES PATENT AND TRADEMARK OFFICE
CERTIFICATE OF CORRECTION

7PATENT NO. : 6,005,481
DATED : December 21, 1999
INVENTOR(S) : Masahiro Takagi et al.

It is certified that error appears in the above-identified patent and that said Letters Patent is hereby corrected as shown below:

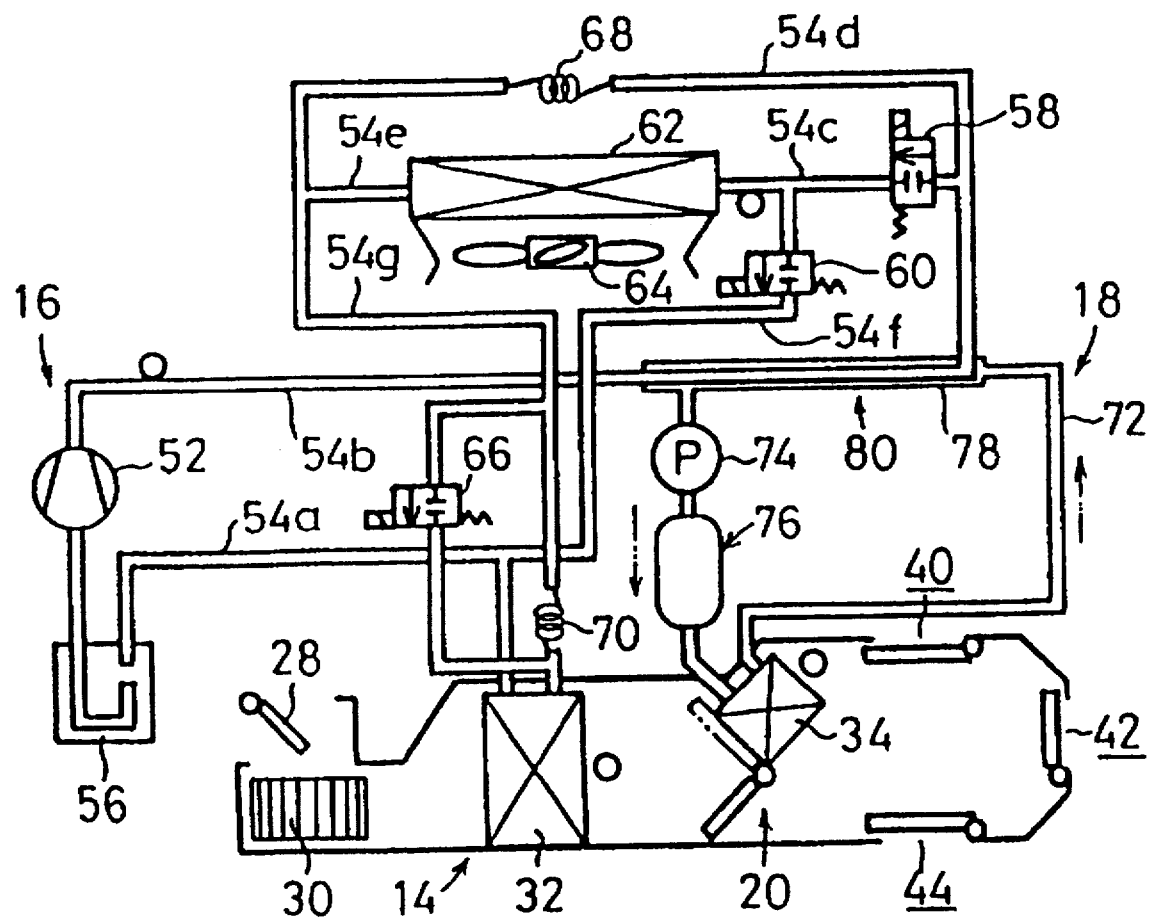

FIG.10